Figure 1:
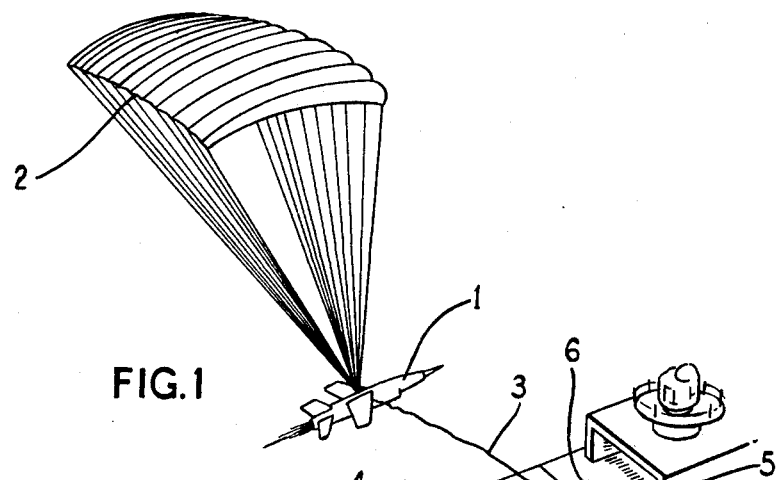

United States Patent [19]

Greenhalgh et al.

[11] 3,980,259
[45] Sept. 14, 1976

[54] AIRCRAFT RECOVERY METHODS

[75] Inventors: Richard David Greenhalgh; Ronald Alexander Saunders; George Reginald Seyfang, all of Warton near Preston, England

[73] Assignee: British Aircraft Corporation Limited, London, England

[22] Filed: Apr. 2, 1975

[21] Appl. No.: 564,639

[30] Foreign Application Priority Data

Apr. 3, 1974  United Kingdom............... 14871/74

[52] U.S. Cl. ..................... 244/139; 114/43.5 AC; 244/116
[51] Int. Cl.² ........................................ B64D 17/80
[58] Field of Search ........... 244/139, 115, 113, 116, 244/17.17, 145; 114/43.5 AC; 89/16; 102/63, 89

[56] References Cited
UNITED STATES PATENTS 2,257,277  9/1941  Righter et al. ...................... 244/139
2,471,544  5/1949  Ring.................................... 244/115
3,285,546  11/1966  Jalbert............................... 244/145
3,646,847  3/1972  Drew .................................. 102/89 X
3,796,398  3/1974  Eilertson............................ 244/139

FOREIGN PATENTS OR APPLICATIONS 361,720  11/1931  United Kingdom................ 244/115

Primary Examiner—Trygve M. Blix
Assistant Examiner—Barry L. Kelmachter
Attorney, Agent, or Firm—Cushman, Darby & Cushman

[57]  ABSTRACT

A powered remotely piloted vehicle which is not controllable at the low landing speeds necessary for landing on a platform of small area is provided with a para-foil type wing deployable at the beginning of a recovery sequence, and is further provided with a rocket ejectable line which is passed to the landing platform and winched in so that the composite flight vehicle and deployed para-foil wing is drawn towards the platform after the manner of a kite.

2 Claims, 3 Drawing Figures

U.S. Patent   Sept. 14, 1976   3,980,259

AIRCRAFT RECOVERY METHODS

This invention relates to the recovery of flight vehicles, that is to say effecting transition of the vehicles from an in-flight state to an on-ground state.

There exists a problem in the recovery of flight vehicles having a relatively high flight speed but which are unable to fly sufficiently slowly to land on a landing surface of restricted area. The problem is particularly acute where the flight vehicle is of the remotely piloted type and is of a relatively small and simple design with a minimum of sophisticated high lift devices which would require complex remotely operated actuators. An object of the present invention is to provide method and means for effecting transition of a flight vehicle from an in-flight state to an on-ground state in a simple and effective manner. A further objective is the effecting of such transition where the landing surface is a platform associated with a moving vehicle.

According to one aspect of the present invention a method of effecting transition of a flight vehicle from an in-flight state to an on-ground state includes the following steps:

deploying a lift-producing means from a stowed position in the vehicle, manoeuvring the combination of the vehicle and its deployed lift-producing means to a position higher than and in the region of the landing surface, causing a line to be passed between the combination vehicle and the landing surface, causing the combination vehicle to act similarly to a kite to maintain tension in the line, and winding the line in so that the combination vehicle is drawn onto the landing surface.

According to a further aspect of the present invention a flight vehicle which is to be brought from an in-flight state to an on-ground state and is not controllable at relatively slow landing speeds, includes lift-producing means stowed within it for deployment to provide sustaining lift, and line means also stowed within the vehicle to be passed to a landing surface and by means of which the combination of the vehicle and its deployed lift-producing means can be hauled as a kite towards the landing surface.

Preferably the lift-producing means is in the form of an aerofoil cross-sectioned fabric wing inflated by the pressure of the free air flow on deployment. In such cases the deployed lift-producing means has the flight vehicle suspended from it.

Figure 2:
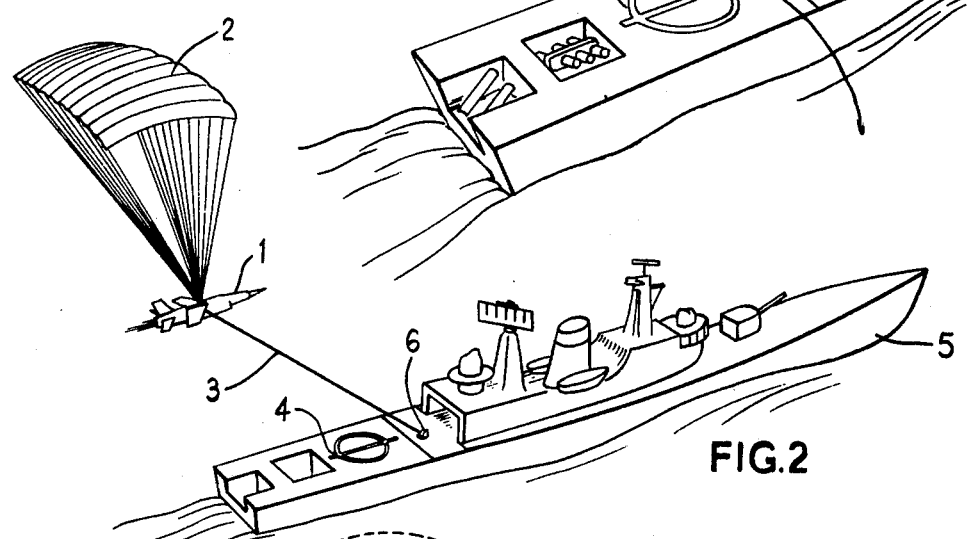

A preferred embodiment of the invention is described with reference to the accompanying drawings. In these drawings:

FIG. 1 is a perspective view of the flight vehicle in an early stage of the recovery sequence, FIG. 2 is a similar view, on a smaller scale, to that of FIG. 1 but with the flight vehicle in a subsequent recovery stage, and, FIG. 3 is again a similar view, but with the flight vehicle in a late stage of the recovery sequence.

In the Figures, a flight vehicle in the form of a remotely piloted vehicle (RPV) 1 powered by a turbojet engine is provided with an aerofoil cross-sectioned fabric wing 2 capable of being inflated by the pressure of air flowing into it on deployment. Such a wing is known as a para-foil and is described in U.S. Pat. No. 3,285,546.

The wing 2 is stowable within the RPV structure until required to be deployed. The RPV 1 is also provided with a line 3 stowable within its structure and capable of being rapidly extended in a particular direction by rocket means, not shown.

The RPV 1 is required to be positioned, when transition is effected from an in-flight state to an on-ground state, on a small landing platform 4 carried by a seagoing vessel 5. The vessel is provided with winch means 6 to which the line 3 is attachable for winding purposes. The landing surface may alternatively be part of a field or other land area or on a land vehicle.

The method of RPV recovery is as follows. Following a mission, assuming an RPV 1 is to be recovered by the vessel 5, the RPV is flown on a heading similar to that of the vessel but at a higher altitude. The ground speed of the RPV is of the order of 100–160 knots. When the RPV is in the region of the vessel 5, the wing 2 is deployed so that the RPV is suspended from it. The ground speed is then of the order of 10–30 knots and the engine is still operating to compensate for wind conditions and for the speed of the vessel 5. It may be desirable to overtake the vessel 5 in some circumstances and the ground speed of the RPV may be varied accordingly by adjusting the engine thrust. In high wind conditions, the ground speed may be nil.

The combination of the RPV and its deployed wing 2 is caused to descend to a position a little higher than but displaced in plan to one side of the landing platform, still maintaining the same heading as the vessel 5. It is then caused to fly level and at a zero or near zero speed relative to the platform as illustrated in FIG. 1. At this stage the line 3 is fired laterally from the RPV to line across the landing platform 4. The line 3 is then connected to the winch and the wing is adjusted to a condition in which the line 18 is maintained taut and the RPV engine shut down. The combination of the RPV and its deployed wing then acts in a similar manner to a kite as illustrated in FIG. 2.

Figure 3:
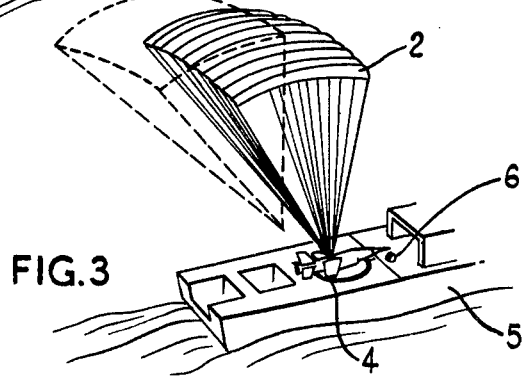

Finally, the line is winched in until the RPV settles onto the landing platform as illustrated in FIG. 3. The wing 2 is then released from the RPV for subsequent salvage.

Although the parafoil-type wing is preferred since it is readily stowable and requires no stored gas for pressurisation, alternative wings could be of the Rogallo-type or of the fabric-type sealed for inflation by pressurised gas.

The landing surface, in an alternative to that described, may be formed on a land vehicle. In yet a further alternative the landing surface is an area of ground in which case the prevailing wind and/or the rapid winding in of the line 3 provide any necessary wind speed to provide lift at the low ground speeds necessary for landing.

We claim:

1. A method of effecting transition of a flight vehicle having propulsion means from an in-flight state to an on-ground state including the following steps:

deploying an inflatable wing from a stowed position in the vehicle such that the vehicle is suspended therefrom, maneuvering the combination of the vehicle and its deployed wing with the propulsion means operating to a position higher than and in the region of a landing surface, causing a line to be passed between the combination vehicle and the landing surface, causing the combination vehicle to act as a kite to maintain tension in the line by stopping the propulsion means, and, winding the line in so that the combination vehicle is drawn toward the landing surface.

2. A method according to claim 1 wherein the combination vehicle is manoeuvred to a position displaced in plan to one side of the landing surface and the line is ejected laterally from the vehicle to lie across the landing surface.

* * * * *